March 6, 1928.

A. HAMBURGER ET AL 1,661,611

CAMERA FOR COLOR PHOTOGRAPHY

Filed Jan. 13, 1925

Patented Mar. 6, 1928.

1,661,611

UNITED STATES PATENT OFFICE.

ARON HAMBURGER AND HERBERT ERNEST COSTON, OF LONDON, ENGLAND.

CAMERA FOR COLOR PHOTOGRAPHY.

Application filed January 13, 1925, Serial No. 2,180, and in Great Britain March 22, 1924.

This invention relates to cameras adapted for use in color photography and more particularly to the cinema type wherein the sensitized films adapted to be exposed to the analyzed light are arranged in mutually inclined planes.

In one form of camera of the above type the composite light from the object to be photographed passes through a lens system on its way to a transparent mirror surface, such as lightly platinized glass, arranged at an angle of 45° to the incident beam. The incident beam is thus divided into two parts, one along and one in a direction at right angles to the original beam.

Each of the two beams then passes through one or more suitable color filters in its passage to its appropriately sensitized film.

The object of the present invention is to provide a camera wherein a pair of prisms and coacting color filters are suitably arranged to replace the foregoing arrangement.

The invention consists in a camera including two prisms cemented together by their faces to form a block arranged between the camera lens and at least two sensitized surfaces, the cemented face of one of the prisms being partly reflecting and partly transparent to light, and suitable color filters worked integrally into any of the optically used surfaces of the prism block. Auxiliary color filters may be mounted in the gate, or in any other position between the source of light and the sensitized surfaces.

A color filter may be arranged with particular advantage immediately behind the mirror face of the prism block, since in this position it will be protected efficiently.

The invention also consists in a camera as set forth above including means for mounting said prism block in the camera in a universally adjustable manner.

The invention also consists in a camera as set forth above including a plurality of prism blocks in universally adjustable mounts adapted to be interchangeable in the camera body.

The invention also consists in a camera as set forth above substantially as described with reference to the accompanying drawings.

The invention may be carried into effect by way of example in the following manner which will be described with reference to the accompanying drawings, in which:—

Figure 1:
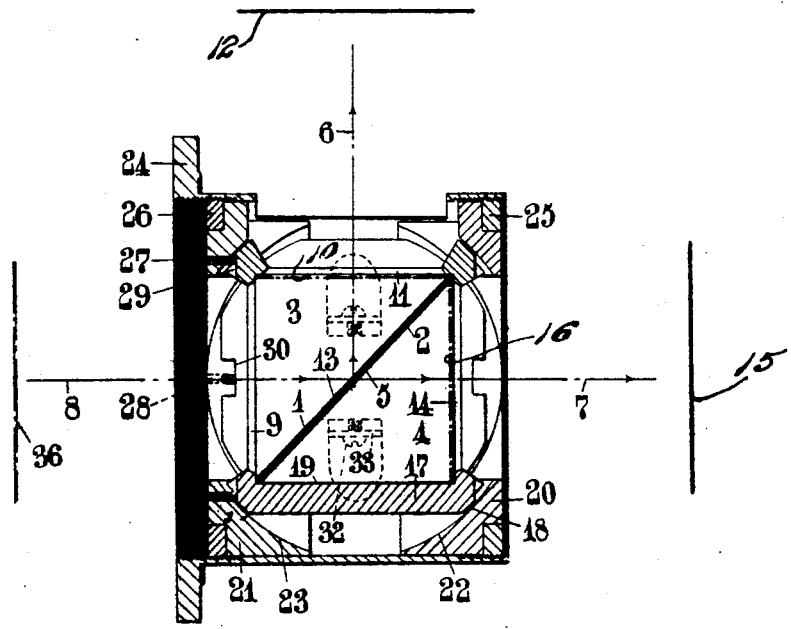
Figure 1 represents a section of the prism block in its first and second mountings, taken through the centre of the gates or orifices for the entrance or exit of light.
Figure 2:
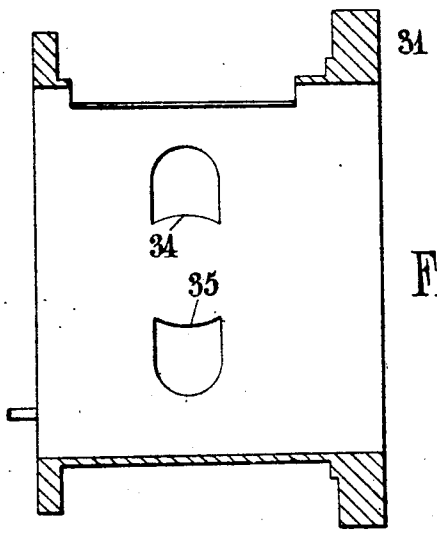
Figure 2 is a corresponding section of the fitting attached to the camera body for receiving the complete mount shown in Figure 1.

As shown in the drawings the hypotenuse surfaces 1 and 2 of a pair of 45° isoscles prisms 3 and 4 respectively enclosing between them a thin sheet 5 of suitably colored gelatine or glass are cemented together by means of Canada balsam. The hypotenuse surface 1 of the first prism 3 is platinized or silvered or coated with a thin mirror at 13 with any suitable substance by cathode discharge, or other suitable coating process, to a degree which produces the required ratio between the reflected and transmitted light beams 6 and 7 resulting from a beam of composite light 8 entering normal to the right angle face 9.

The reflected beam 6 passes through a color filter 10 arranged on the other right angle face 11 of the prism 3 and thence to a sensitized film surface 12 arranged parallel to the latter face, the color filter 10 being actually worked into the surface 11 of the prism 3.

The beam 7, transmitted unaltered in direction through the platinized or other mirror coated surface 13, passes through the color filter 5 between the hypotenuse faces 1 and 2 and normally through the face 14 of the second prism on its way to a second sensitized film 15 arranged at right angles to the first film 12. A further color screen 16 of glass-covered gelatine or colored glass may be interposed if desired between the surface 14 and the film 15 and is worked into the last-mentioned face of the second prism, and this filter may supplement or even replace the color filter 5.

The prism block is sunk slightly into a metal carrier 17 whose outer surfaces 18 are formed as parts of a sphere. The carrier 17 may cover the optically unutilized face 19 of the prism block.

Two annular members 20, 21, having faces 22 and 23 respectively which are parts of a sphere equal in radius to the spherical surfaces of the metal carrier 17, are arranged to slide into a tubular member and embrace the cemented prisms with their carrier 17.

The tubular member 24 carrying the prisms and carrier is fixed by means of screws not shown in a frame 31 which forms part of the camera body and is thus easily dismounted and replaced by other tubular members and prism assemblies having different optical or color characteristics without altering the foregoing adjustment of the prisms.

Lock rings 25, 26 are provided as shown for clamping the parts 20 and 21 to the carrier 17 and adjustment of the carrier is carried out by screws 27 in one plane and 28 in a plane at right angles to the first-mentioned plane, acting on corresponding flat surfaces 29, 30 formed on the spherical mount 17.

The adjustment of the prism mount 17 in a third or remaining plane at right angles to those already mentioned is accomplished by means of the screws 32 and washers 33 which are attached to the prism carrier 17 abutting against the edges 34 and 35 of slots formed as shown in the member 31.

A suitable masking device, not shown, adjustable to suit lenses of varying foci may be arranged at some distance in front of the lens to exclude stray reflections of objects outside the field and an initial color screen 36 may be interposed on or before the incident face 9 of the prism 3.

Having now described our invention, what we claim as new and desire to secure by Letters Patent is:—

1. In a camera for color photography two right angled prisms cemented together by their hypotenuse faces to form a block arranged between the camera lens and a plurality of sensitized surfaces, a thin layer of material interposed between said cemented faces of such a nature that it is partially reflecting and partially transparent to light, and a color filter worked integrally into the hypotenuse prism face immediately following said thin layer.

2. In a camera as claimed in claim 1, a color filter worked integrally into the hypotenuse prism face immediately following said thin layer.

3. In a camera as claimed in claim 1, a first mount for said prism block whose outer surface forms part of a sphere.

4. In a camera as claimed in claim 1, a first mount for said prism block whose outer surface forms part of a sphere and a second mount coacting with said first mount, the inner surface of said second mount forming part of a sphere whose radius is substantially the same as that of the first mount.

5. In a camera as claimed in claim 1, a first mount for said prism block whose outer surface forms part of a sphere, a second mount coacting with said first mount, the inner surface of said second mount forming part of a sphere whose radius is substantially the same as that of the first mount and means for adjusting said first mount in said second mount about two axes at right angles to each other.

6. In a camera as claimed in claim 1, a first mount for said prism block whose outer surface forms part of a sphere, a second mount coacting with said first mount, the inner surface of said second mount forming part of a sphere whose radius is substantially the same as that of the first mount, means for adjusting said first mount in said second mount about two axes at right angles to each other and a third mount having a cylindrical inner surface into which a cylindrical outer surface of the second mount is adapted to fit.

7. In a camera as claimed in claim 1, a first mount for said prism block whose outer surface forms part of a sphere, a second mount coacting with said first mount, the inner surface of said second mount forming part of a sphere whose radius is substantially the same as that of the first mount, means for adjusting said first mount in said second mount about two axes at right angles to each other, a third mount having a cylindrical inner surface into which a cylindrical outer surface of second mount is adapted to fit and means for adjusting said second mount in said third mount about an axis at right angles to both said first-mentioned axes.

In testimony whereof we have signed our names to this specification.

ARON HAMBURGER.
HERBERT ERNEST COSTON.